United States Patent [19]

Tahara et al.

[11] Patent Number: 5,548,435
[45] Date of Patent: Aug. 20, 1996

[54] OPTICAL TRANSMITTER

[75] Inventors: Yoko Tahara; Yasunori Nagakubo, both of Kawasaki, Japan

[73] Assignee: Fujitsu Limited, Kanagawa, Japan

[21] Appl. No.: 370,165

[22] Filed: Jan. 9, 1995

[30] Foreign Application Priority Data

Jun. 22, 1994 [JP] Japan ................................. 6-140127

[51] Int. Cl.⁶ .................................................. H04B 10/04
[52] U.S. Cl. ............................ 359/180; 359/187; 372/38
[58] Field of Search ..................................... 359/180, 187; 372/29, 38; 327/72, 73; 382/273

[56] References Cited

U.S. PATENT DOCUMENTS 5,107,362  4/1992  Motoshima et al. .................... 359/187
5,390,030  2/1995  Kudose ................................... 382/273

*Primary Examiner*—Leo Boudreau
*Assistant Examiner*—Kinfe-Michael Negash

[57] ABSTRACT

An optical transmitter for optimizing the duty ratio of a high-speed optical transmission signal has an output unit for providing an optical output signal according to an electric signal, a monitor circuit for providing an output representative signal related to the output of the output unit, a driver for determining the logical value of each bit of an input data signal according to a reference voltage and driving the output unit according to the determination, an input signal detector for providing an input representative signal according to the input data signal, and a duty ratio controller for comparing the input and output representative signals with each other and controlling the reference voltage to the driver so that the difference between the input and output representative signals is reduced, to thereby optimize the duty ratio of the optical output signal.

13 Claims, 17 Drawing Sheets

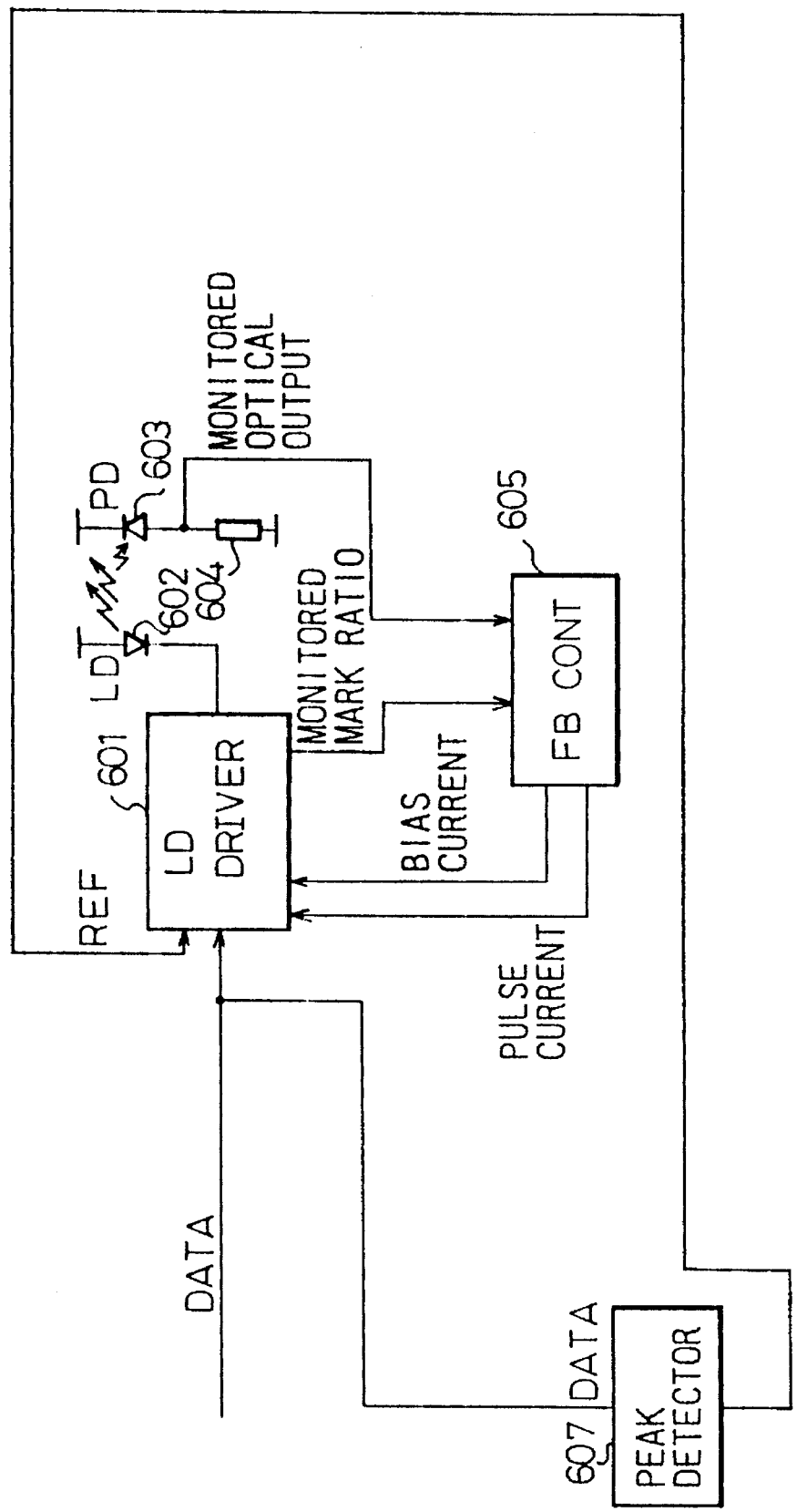

OPTICAL TRANSMITTER

BACKGROUND OF THE INVENTION

1. Field of the Invention

The present invention relates to an optical transmitter, and particularly, to an optical transmitter, for an optical communication module, able to transmit high-speed optical signals.

2. Description of the Related Art

An optical transmitter of an optical communication module has a laser diode (LD) driver. The LD driver has a differential amplifier that has an input terminal for receiving input data and another input terminal for receiving a reference voltage. The reference voltage is used to determine whether each bit of the input data is 1 or 0. According to the determination, the LD driver drives an LD.

The LD provides a forward optical output that is sent to an optical fiber transmission line and a backward optical output, which is monitored by a photodiode (PD) arranged in an LD module that incorporates the LD. In response to the backward optical output, the PD provides a current, which is converted into a direct-current (DC) voltage by a load element consisting of resistance and capacitance components and is sent to a feedback controller.

The feedback controller receives the DC voltage as well as a mark ratio voltage. The mark ratio voltage is a rectified voltage representing the ratio of 1s to 0s per unit time in a sequence of bits of the input data. The feedback controller subtracts the mark ratio voltage from the DC voltage, to provide an optical output signal related only to the output of the LD. The feedback controller compares the optical output signal with an internal reference voltage and controls a pulse drive current and a bias current both applied to the LD driver such that the optical output signal is kept at a predetermined power. This is called APC (automatic power control).

The optical transmitter has a temperature compensator to adjust the temperature gradient of an external reference voltage to that of data input to the differential amplifier. Namely, the temperature compensator carries out feedforward control on the temperature gradient of the external reference voltage, to compensate for a fluctuation in the differential amplifier due to a change in the temperature.

This prior art may adjust the signal level-to-temperature characteristic of the external reference voltage to that of data input to the LD driver.

However, the LD driver is usually an integrated circuit, and the differential amplifier incorporated in the LD driver to receive internal data and an internal reference voltage is usually made of high-speed gallium arsenide active elements. In this case, adjusting the temperature characteristic of the external reference voltage is not always effective with regard to the differential amplifier because some elements in the integrated LD driver have different temperature characteristics and are sensitive to the reference potential.

Accordingly, the prior art LD driver frequently changes the duty ratios of input and output signals and the optical output power, reduces the transmission performance and improperly carries out the APC. These problems are serious in an optical transmitter that handles a high-speed signal whose waveform is largely made of rising and falling edges and which is sensitive to the set level of a reference voltage.

SUMMARY OF THE INVENTION

An object of the present invention is to provide an optical transmitter that is insensitive to element differences and temperature changes in an integrated circuit such as an LD driver, requires no external adjustment nor the measurement of the characteristics of elements incorporated in the integrated circuit, and automatically optimizes the duty ratio of an output signal.

In order to accomplish the object, the present invention provides an optical transmitter having an output unit for providing an optical output signal according to an electric signal, a monitor circuit for providing an output representative signal according to the output of the output unit, a driver for determining the logical value of each bit of input data according to a reference voltage and driving the output unit according to the determination, an input signal detector for providing an input representative signal according to the input data, and a duty ratio controller for comparing the input and output representative signals with each other and controlling the reference voltage to the driver so that the difference between the input and output representative signals is reduced, to thereby optimize the duty ratio of the optical output.

The monitor circuit may provide, as the output representative signal, an optical output signal from the output unit, or a mark ratio signal from the driver. The input signal detector may have an average detector for providing, as the input representative signal, the average of the input data, or a mark ratio detector for providing, as the input representative signal, the mark ratio of the input data.

The input signal detector may have an NRZ-RZ converter that converts an NRZ input signal into an RZ signal by excluding the edges of the NRZ signal according to a clock signal supplied in synchronization with the input signal or regenerated from the input signal.

The optical transmitter may have a shaping circuit for shaping the input data, to suppress a fluctuation in the average of the input data, and providing the driver with shaped input data. The shaping circuit may employ a clamp circuit for suppressing a fluctuation in the level of the input data, or a flip-flop circuit for suppressing a fluctuation in the level of the input data and fixing the pulse width of the input data.

Another aspect of the present invention provides an optical transmitter having an output unit for providing an optical output signal according to an electric signal, a driver for determining the logical value of each bit of input data according to a reference voltage and driving the output unit according to the determination, and a peak detector for detecting the peak of the input data and feeding forward half of the peak as the reference voltage.

The output unit employs a laser diode (LD) to provide an optical output signal in response to an electric signal. The optical transmitter may have a monitor circuit employing a photodiode (PD) for monitoring the optical output signal of the LD, and a mark ratio monitor circuit. The driver is an integrated circuit that determines the logical value of each bit of input data according to the reference voltage and drives the LD according to the determination.

The input signal detector according to the present invention detects, as the input representative signal, the average or mark ratio of input data. The duty ratio controller has a comparator for comparing the average or mark ratio provided by the input signal detector with the signal provided by the PD or the mark ratio monitor circuit and controls the reference voltage to the driver such that the difference between the compared signals is reduced, to thereby optimize the duty ratio of the optical output.

The NRZ-RZ converter converts an NRZ input signal into an RZ signal by excluding the edges of the NRZ signal according to a clock signal supplied in synchronization with the input signal or regenerated from the input signal, to thereby cancel a fluctuation in the duty ratio or mark ratio of the input signal. The shaping circuit, consisting of the clamp circuit or the flip-flop circuit, cancels a fluctuation in the level and pulse width of the input signal.

It is possible to more simply control the duty ratio of an input data signal by the use of an output unit, a driver, and a peak detector that detects the peak of the input data signal and feeds forward half of the peak as the reference voltage.

BRIEF DESCRIPTION OF THE DRAWINGS

The present invention will be more clearly understood from the description as set forth below with reference to the accompanying drawings wherein:

FIG. 24 shows an optical transmitter according to a sixth embodiment of the present invention.

DESCRIPTION OF THE PREFERRED EMBODIMENTS

Before describing the preferred embodiments according to the present invention, examples of the related art are provided with reference to FIGS. 1 to 6.

Figure 1:
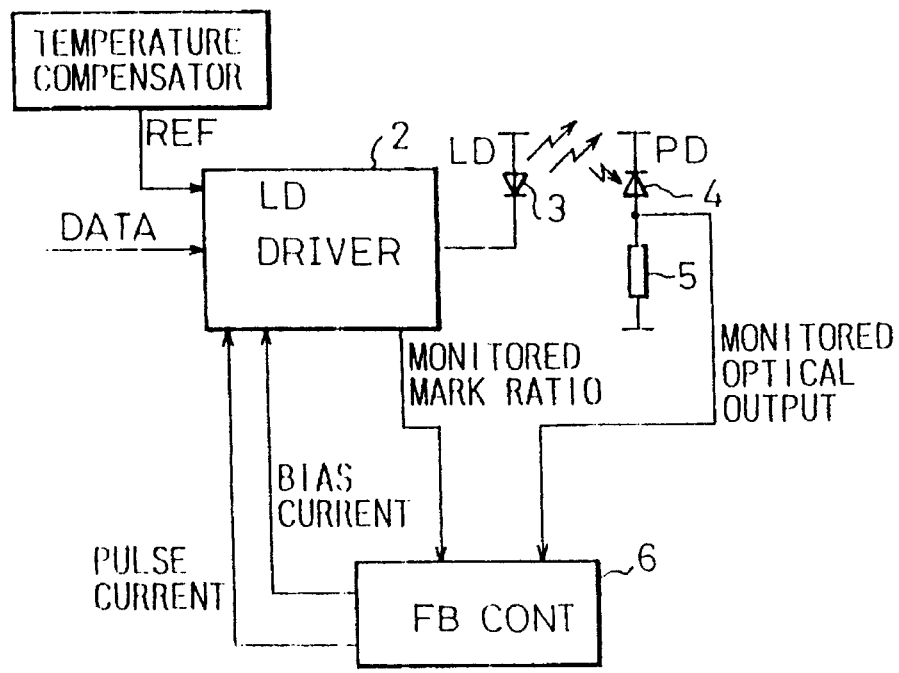
FIG. 1 shows an optical transmitter according to a prior art.

FIG. 1 shows an optical transmitter of an optical communication module according to the related art.

A laser diode (LD) driver 2 compares an input data signal DATA with a reference voltage REF, to determine whether each input data bit is 1 or 0, and drives an LD 3 according to the determination.

The LD 3 provides a forward optical output to an optical fiber transmission line and a backward optical output, which is detected by a monitor photodiode (PD) 4. The LD 3 and PD 4 are arranged in the same LD module. The PD 4 provides a monitoring current, which is converted into a direct-current (DC) voltage by a load element 5 consisting of resistance and capacitance components. The DC voltage is sent to a feedback controller 6.

The feedback controller 6 receives the DC voltage as well as a mark ratio voltage that is a rectified voltage representing the ratio of 1s to 0s per unit time in a sequence of input data bits. The feedback controller 6 subtracts the mark ratio voltage from the DC voltage, to provide a monitoring optical output signal related only to the LD 3. The feedback controller 6 compares the monitoring optical output signal with an internal reference voltage and controls both the pulse drive current and the bias current applied to the LD driver 2 so that the monitoring optical output signal is kept at a predetermined constant voltage. This is the automatic power control (APC).

Figure 2:
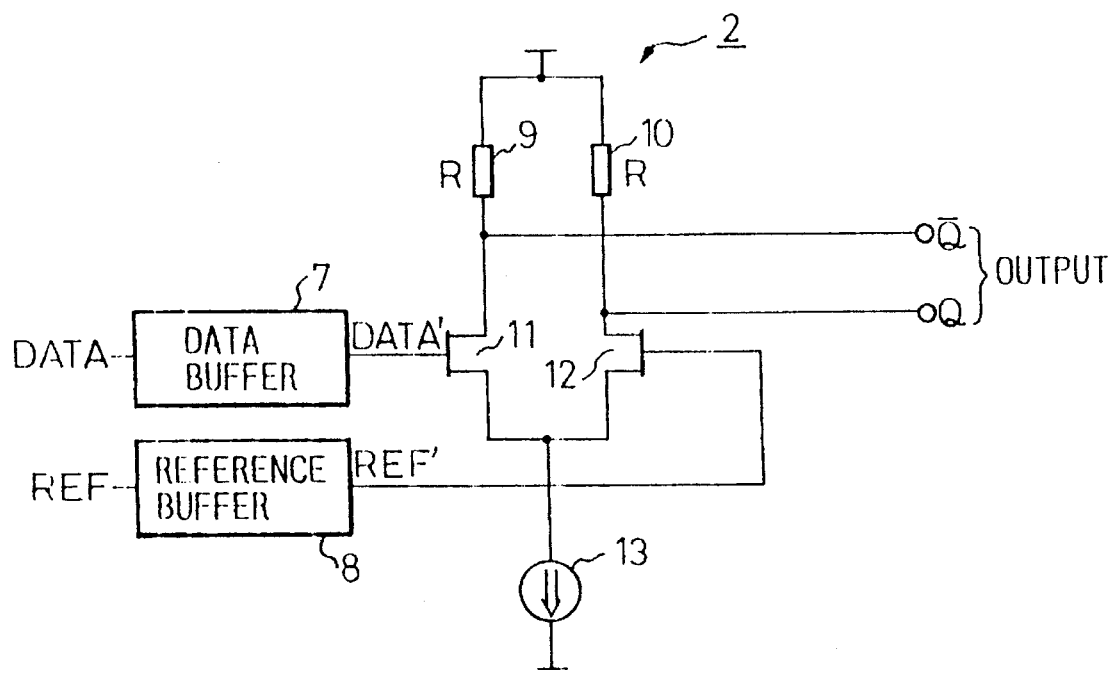
FIG. 2 shows a differential section of an LD driver.

FIG. 2 shows a differential section of the LD driver 2.

The input data signal DATA is received by a data buffer 7, which provides an internal data signal DATA'. The reference voltage REF is received by a reference voltage buffer 8, which provides an internal reference voltage REF'. The signal DATA' and reference voltage REF' are applied to a differential amplifier consisting of a pair of differential transistors 11 and 12 and a constant current circuit 13. The differential amplifier compares the signal DATA' with the reference voltage REF' and drives the LD 3 accordingly.

The optical transmitter of FIG. 1 has a temperature compensator 1 that carries out feedforward control on the reference voltage REF, to adjust the temperature gradient of the reference voltage REF to that of the input data signal DATA, to thereby compensate for a fluctuation in the operation of the differential amplifier due to a change in the temperature.

Figure 3:
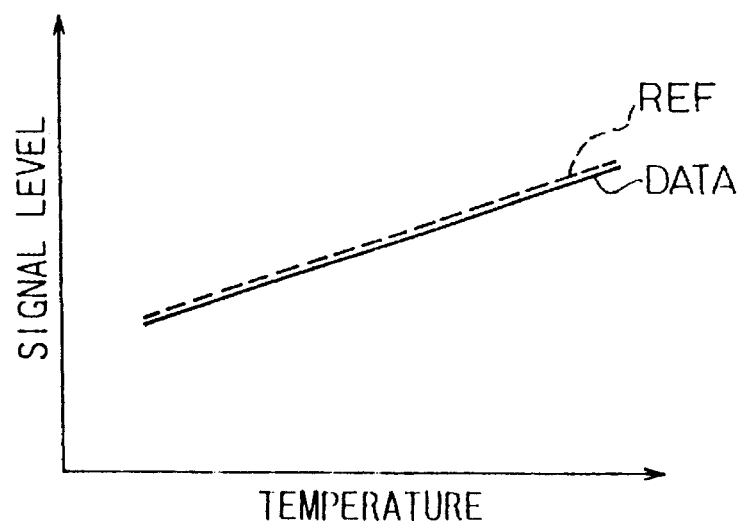
FIG. 3 shows the signal level-temperature characteristic of an input data signal DATA and of a reference voltage REF when a temperature compensator is employed.

FIG. 3 shows the signal level-temperature characteristic of each of the input data signal DATA and reference voltage REF when the temperature compensator 1 is used.

The signal level-temperature characteristic of the reference voltage REF is substantially equal to that of the input data signal DATA due to the temperature compensator 1.

In this way, the prior art is capable of adjusting the signal level-temperature characteristic of the external reference voltage REF to that of the external input data signal DATA. The LD driver 2, however, is usually an integrated circuit employing high-speed gallium arsenide active elements. Accordingly, adjusting the external data signal DATA and external reference voltage REF does not always improve the quality of the internal data signal DATA' and internal reference voltage REF' because elements in the integrated circuit involve different temperature characteristics and are sensitive to the internal reference voltage REF'.

Figure 4:
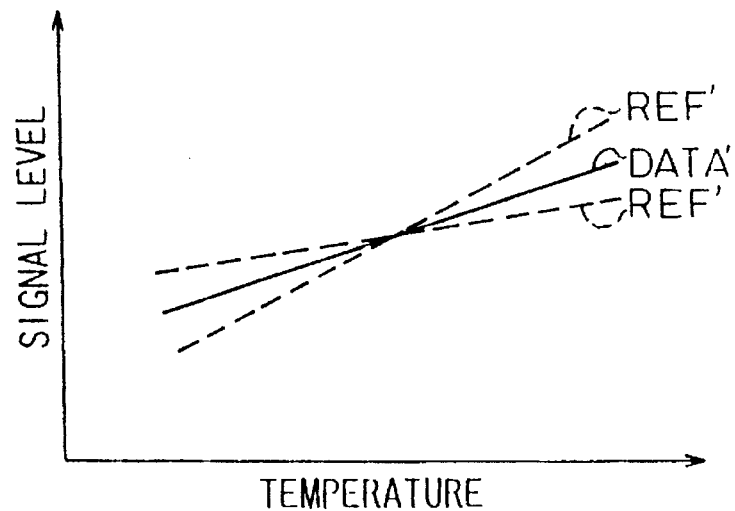
FIG. 4 shows the signal level-temperature characteristic of an internal data signal DATA' and of an internal reference voltage REF' in an integrated circuit.

FIG. 4 shows the signal level-temperature characteristic of each of the internal data signal DATA' and internal reference voltage REF'.

The input data signal DATA and reference voltage REF outside the integrated circuit match with each other (REF=DATA) as shown in FIG. 3. However, the data signal DATA and reference voltage REF pass through the buffers 7 and 8, respectively, the temperature characteristic of the internal data signal DATA' is not always equal to that of the internal reference voltage REF' due to the different temperature characteristics of the elements in the integrated circuit, as shown in FIG. 4. As a result, the duty ratio of an output signal from the differential section varies to change the waveform of an optical output signal from the optical transmitter. Further, if the level of the input data signal changes, the internal data signal DATA' will not match the internal reference voltage REF', to thereby change the waveform of an optical output signal. In this way, the feedforward control of the prior art causes a change in the duty ratio of an optical output signal.

Figure 5:
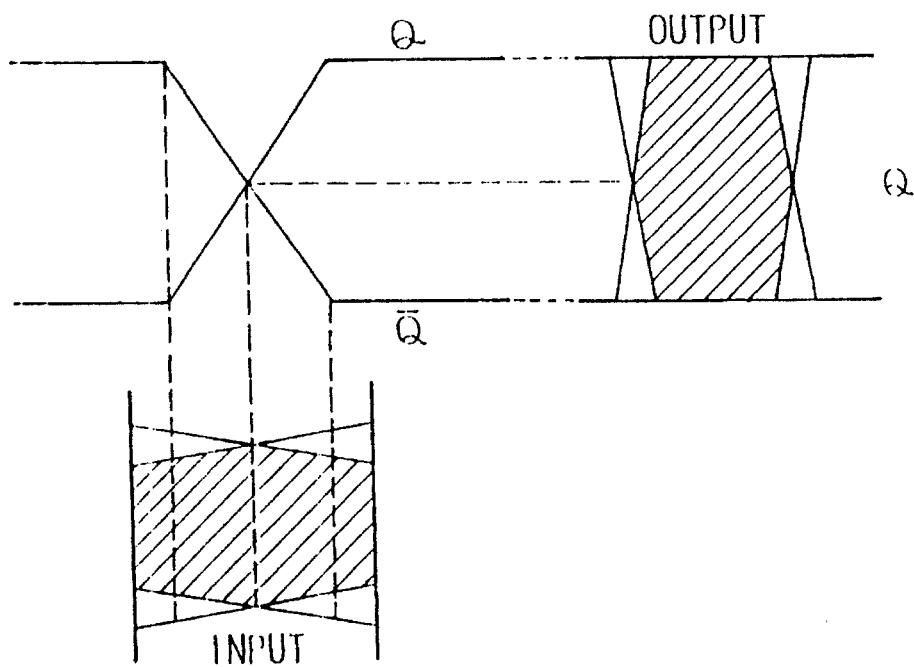
FIG. 5 shows the duty ratio (100%) of an optical output signal with the internal reference voltage REF' being at the center of the internal data signal DATA=3 (REF'=DATA')

FIG. 5 shows the duty ratio (100%) of an optical output signal when the internal reference voltage REF' is at the center of the internal data signal DATA'(REF'=DATA').

Figure 6:
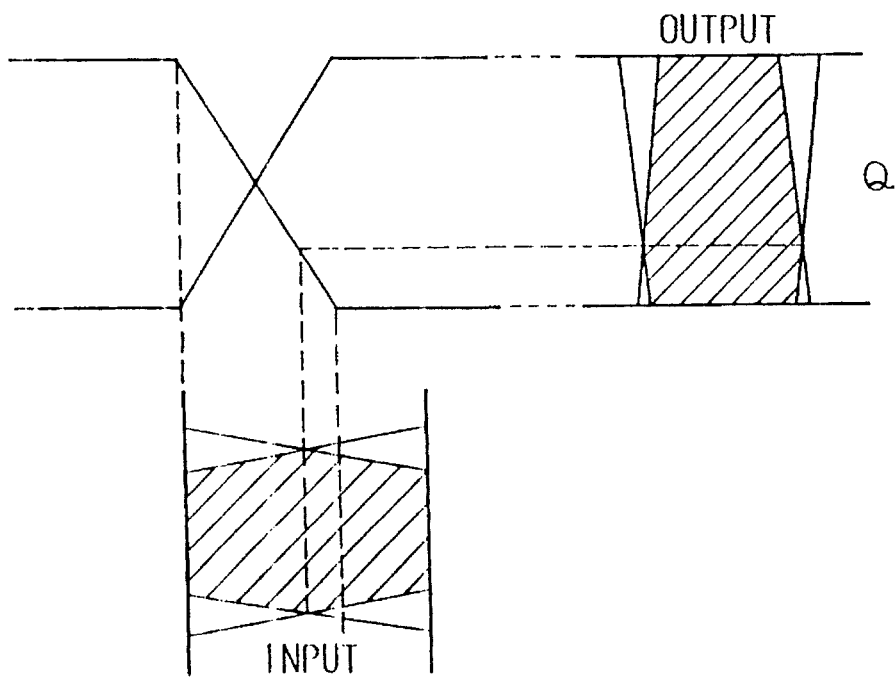
FIG. 6 shows a deterioration in the duty ratio of an optical output signal with the internal reference voltage REF' being shifted from the center of the internal data signal DATA'(REF' is not equal to DATA')

FIG. 6 shows a deterioration in the duty ratio of the optical output signal when the internal reference voltage REF' is shifted from the center of the internal data signal DATA'(REF' is not equal to DATA').

In FIG. 6, it is understood that a deterioration in the duty ratio of the input or output signal causes a change in optical output power, to thereby deteriorate transmission performance. In addition, the deterioration may cause a malfunction in the APC. These problems are serious in an optical transmitter that handles a high-speed signal whose waveform is largely formed of rising and falling edges and which is sensitive to the set level of a reference voltage.

Next, the preferred embodiments of the present invention, to solve these problems, will be explained.

The present invention has three characteristic features. The first feature cancels a fluctuation in an input data signal applied to an LD driver. The second feature provides a detector for detecting a fluctuation in a duty ratio in the LD driver. The third feature optimizes a reference voltage REF applied to the LD driver.

The first to sixth embodiments of the present invention will be explained in detail.

Figure 7:
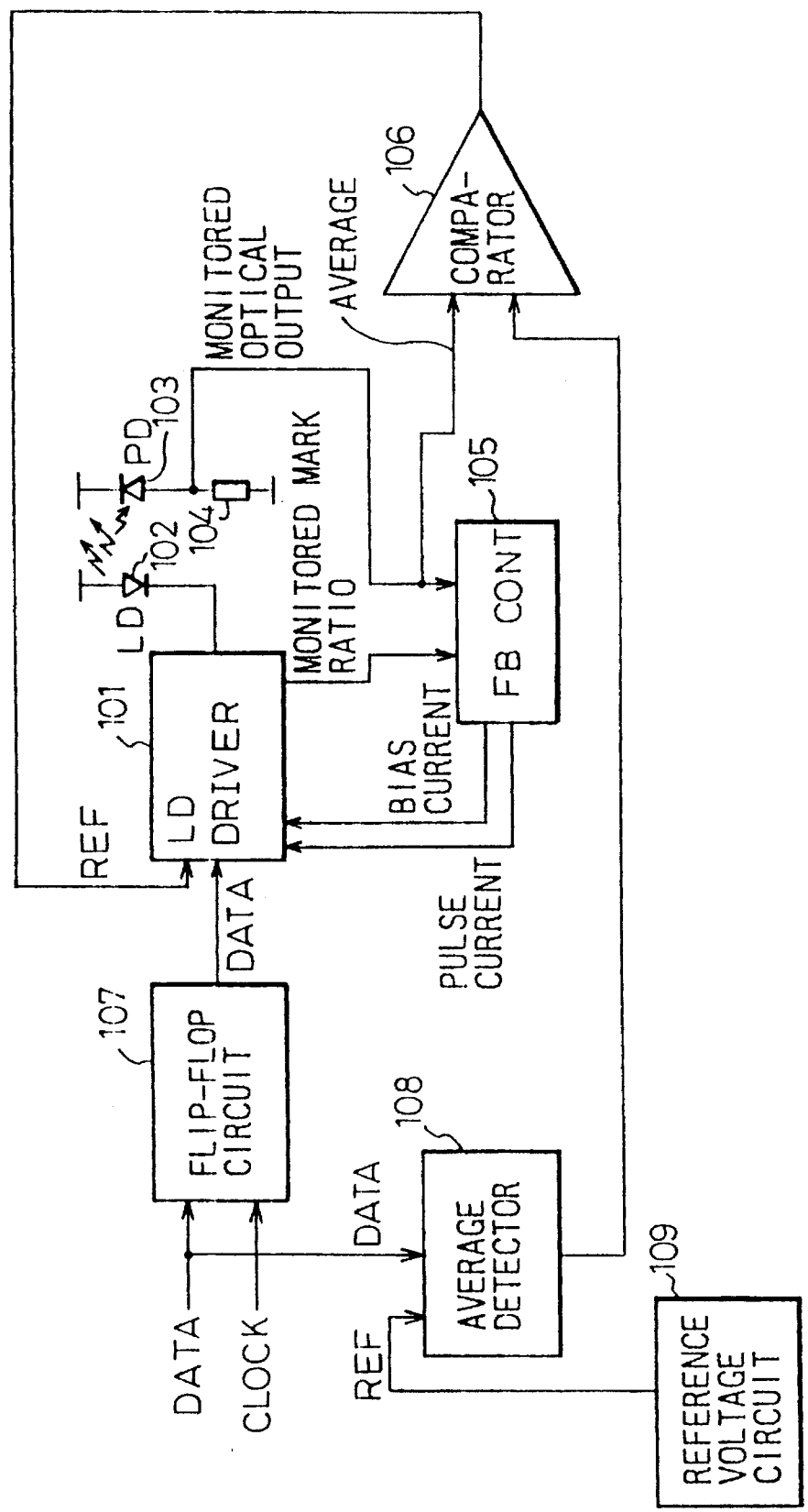
FIG. 7 shows an optical transmitter according to a first embodiment of the present invention.

FIG. 7 is a block diagram showing an optical transmitter according to the first embodiment of the present invention.

The optical transmitter has a laser diode (LD) driver 101, an LD 102, a photodiode (PD) 103, and a load resistor 104. These elements are the same as those of the prior art of FIG. 1, and therefore, they will not be explained again except for the LD driver 101.

Figure 8:
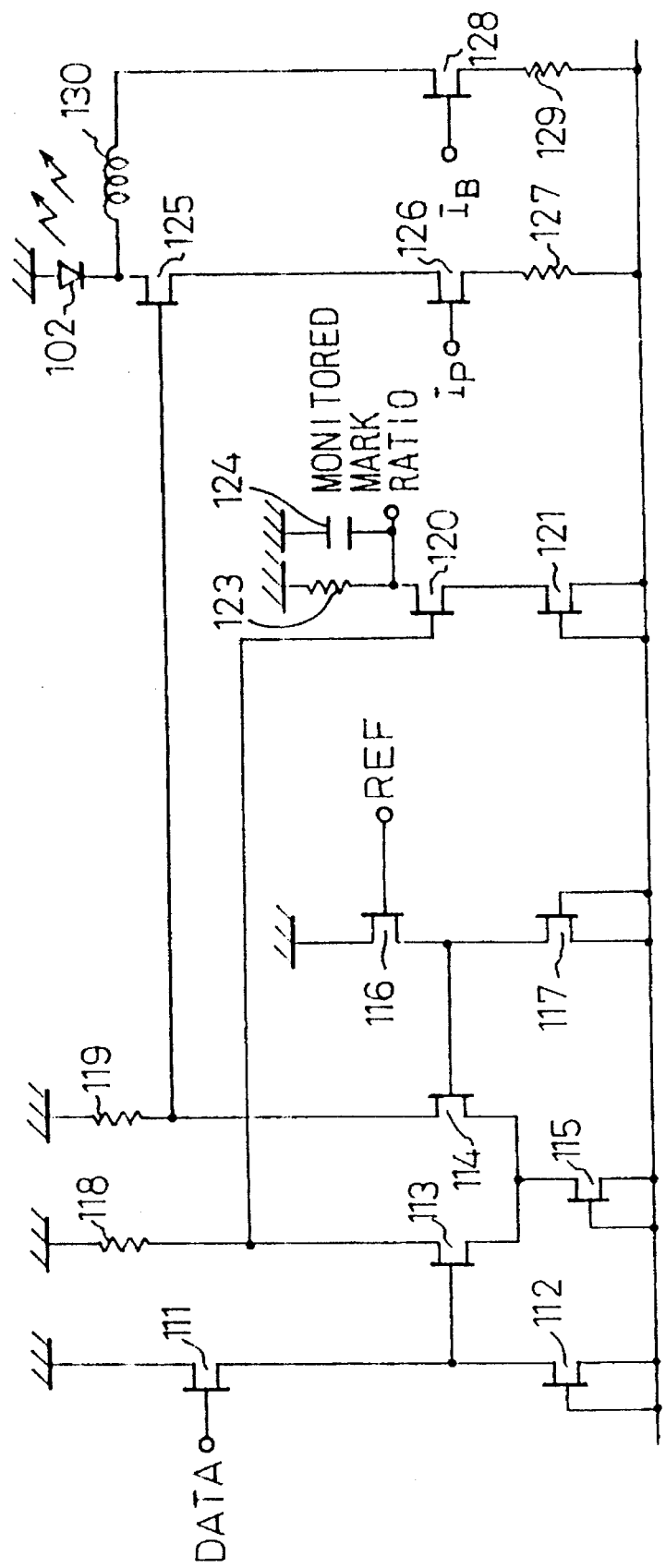
FIG. 8 shows an LD driver of the optical transmitter of FIG. 7.

FIG. 8 is a circuit diagram showing the LD driver 101.

The left part of FIG. 8 shows transistors 111 and 112 corresponding to the data buffer 7 of FIG. 2, and transistors 116 and 117 corresponding to the reference voltage buffer 8 of FIG. 2. A pair of differential transistors 113 and 114 correspond to the transistors 11 and 12 of FIG. 2, load resistors 118 and 119 correspond to the load resistors 9 and 10 of FIG. 2, and a constant current source transistor 115 corresponds to the constant current source 13 of FIG. 2. The buffer transistors 111 and 116 for signals DATA and REF may have different ON voltages and temperature characteristics, and may alter the internal signals DATA' and REF' applied to the differential transistors 113, and 114, respectively. External adjustments cannot cope with these fluctuations.

The middle part of FIG. 8 shows a mark ratio monitor section. A transistor 120 buffers an optical output signal. A resistor 123 and a capacitor 124 integrate the output of the transistor 120 and generate a direct-current (DC) signal proportional to the mark ratio of the optical output signal. The DC signal is sent to the feedback controller 105.

The right part of FIG. 8 shows a drive transistor 125 for driving the LD 102, an LD pulse drive current circuit consisting of a transistor 126 and a resistor 127, and an LD threshold bias circuit consisting of a choke coil 130, a transistor 128, and a resistor 129. The LD pulse drive current circuit and LD threshold bias circuit receive a pulse current control voltage (IP) and a bias current control voltage (IB), respectively, from the feedback controller 105.

Returning to FIG. 7, a D-type flip-flop circuit 107 shapes an input data signal into a signal having a correct pulse width of 100% duty ratio and logical output levels according to a clock signal that is in synchronization with the input data signal and has the same speed as the input data signal. In this way, the flip-flop circuit 107 suppresses a fluctuation in the level of the input data signal. This is the first characteristic of the present invention.

An average detector 108 rectifies an input data signal. Namely, the average detector 108 smooths a random sequence of input data involving bits 1 and 0 and provides an average of the input data. The average detector 108 may be easily realized by a CR integration circuit, a buffer operational amplifier, etc. The input data signal may be an output signal from the flip-flop circuit 107. A reference voltage circuit 109 provides the average detector 108 with a reference signal so that the average detector 108 cancels an offset voltage in the input data signal, carries out temperature compensation on the input data signal, and provides a correct average value. The reference voltage is applied to a ground terminal of the operational amplifier, etc., serving as the average detector 108. This is the second characteristic of the present invention.

A comparator 106 subtracts the average voltage provided by the average detector 108 from a monitoring voltage, i.e., the average of a monitoring optical output voltage from a photodiode (PD) 103 and feeds back a reference voltage REF to the LD driver 101 so that the difference between the compared voltages disappears.

Figure 9:
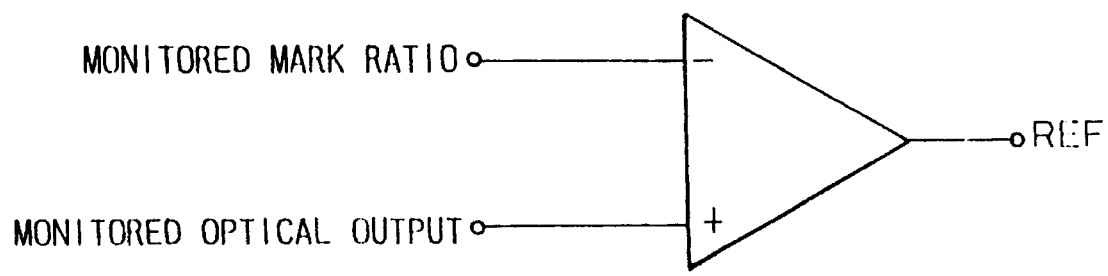
FIG. 9 shows a comparator of the optical transmitter of FIG. 7.

FIG. 9 shows the comparator 106.

The comparator 106 is an operational amplifier having an inverting input terminal that receives the average voltage from the average detector 108, and a non-inverting input terminal that receives the monitoring optical output voltage from the PD 103. An actual signal has a trapezoidal envelope. Accordingly, if the reference voltage REF applied to the LD driver 101 increases, the pulse width of the output of the LD driver 101 becomes narrow to decrease optical output power. If the reference voltage REF drops, the pulse width of the output of the LD driver 101 becomes wider to increase optical output power. The reference voltage REF increases if the monitored optical output voltage is larger than the average voltage, to reduce the optical output power. On the contrary, if the monitoring optical output voltage is smaller than the average voltage, the reference voltage REF falls to increase the optical output power.

This negative feedback control adjusts the duty ratio of an optical output signal from the LD 102 such that the average of the optical output power of the LD 102 becomes equal to the average of the input data signal from the average detector 108 irrespective of the internal elements of the LD driver 101. This is the third characteristic of the present invention.

The function of the average detector 108 will be explained in detail.

Figure 10:
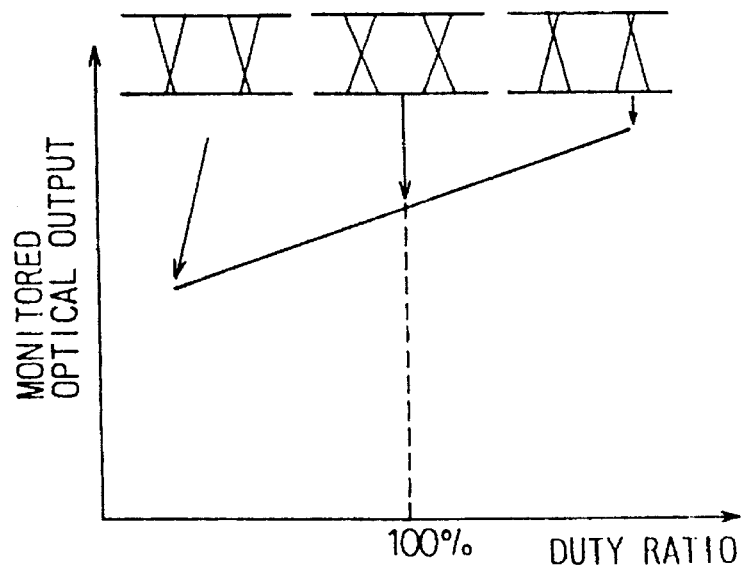
FIG. 10 shows a relationship between the duty ratio and monitored level of an optical output signal.

FIG. 10 shows the relationship between the duty ratio and the monitoring level of an optical output signal.

Figure 11:
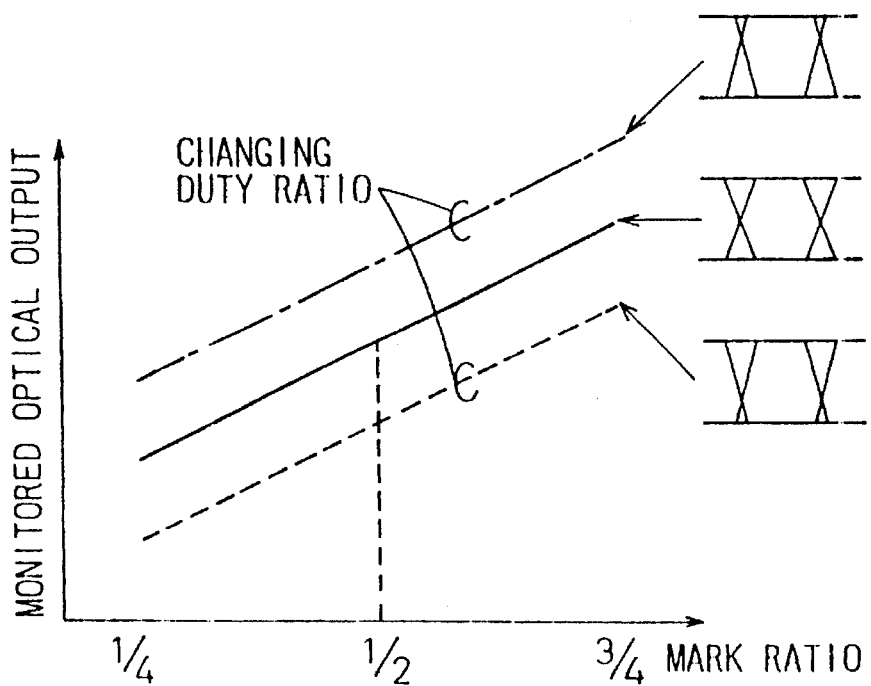
FIG. 11 shows a relationship between the mark ratio and monitored level of an optical output signal.

FIG. 11 shows the relationship between the mark ratio and the monitoring level of an optical output signal.

Figure 12:
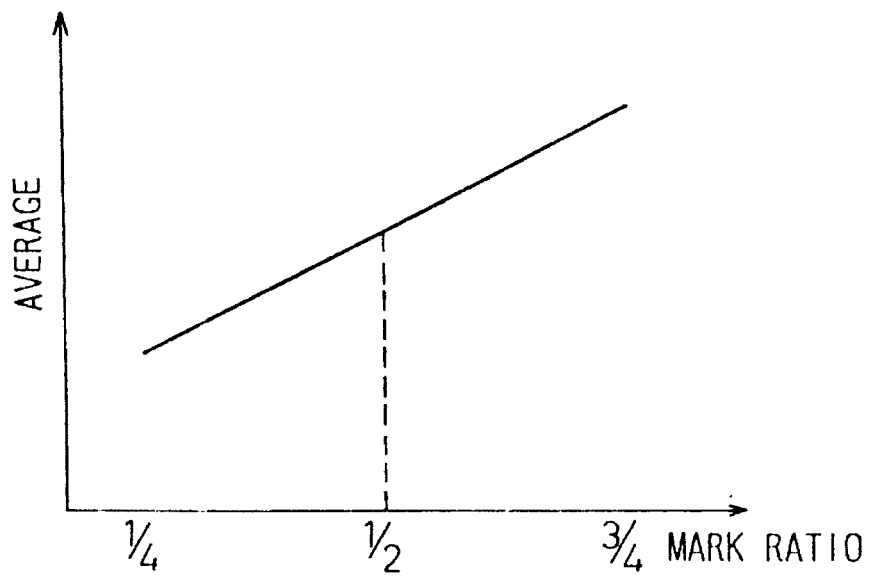
FIG. 12 shows a relationship between the mark ratio of an optical output signal and the average of an input data signal.

FIG. 12 shows the relationship between the mark ratio of an optical output signal and the average of an input data signal.

The upper part of FIG. 10 shows that the optical output power increases in proportion to the duty ratio of an optical output signal.

In FIG. 11, a continuous line indicates that the optical output power increases in proportion to the mark ratio of an optical output signal. The figure also shows that the optical output power varies even at the same mark ratio if the duty ratio of the optical output signal changes between a dot-dash line corresponding to a duty ratio of above 100% and a dot line corresponding to a duty ratio of below 100%.

FIG. 12 shows the relationship between the average (corresponding to optical output power) from the average detector 108 and the mark ratio of an optical output signal. Similar to FIG. 11, the average increases in proportion to the mark ratio.

Accordingly, the comparator 106 subtracts an average voltage provided by the average detector 108 from a monitoring optical output voltage, to cancel a fluctuation in the mark ratio of an optical output signal. Even at the same mark ratio, optical output power varies if the duty ratio of an optical output signal changes. For example, at a mark ratio of ½, the duty ratio of an optical output signal will change if the internal data signal DATA' and internal reference voltage REF' shift from their optimum values due to, for example, a change in the temperature, to thereby provide a different optical output voltage. In this case, the output of the comparator 106 is not affected by any change in the mark ratio, and therefore, the difference provided by the comparator 106 is related only to the change in the duty ratio.

Accordingly, the output of the comparator 106 fed back to the reference voltage input terminal of the LD driver 101 is free from the influence of the mark ratio and optimizes the duty ratio of the optical output signal. In this way, the feedback loop employing the average detector 108 and comparator 106 according to the present invention optimizes the duty ratio of an optical output signal without any influence from a change in the temperature or the different characteristics of the elements in the LD driver 101.

Figure 13:
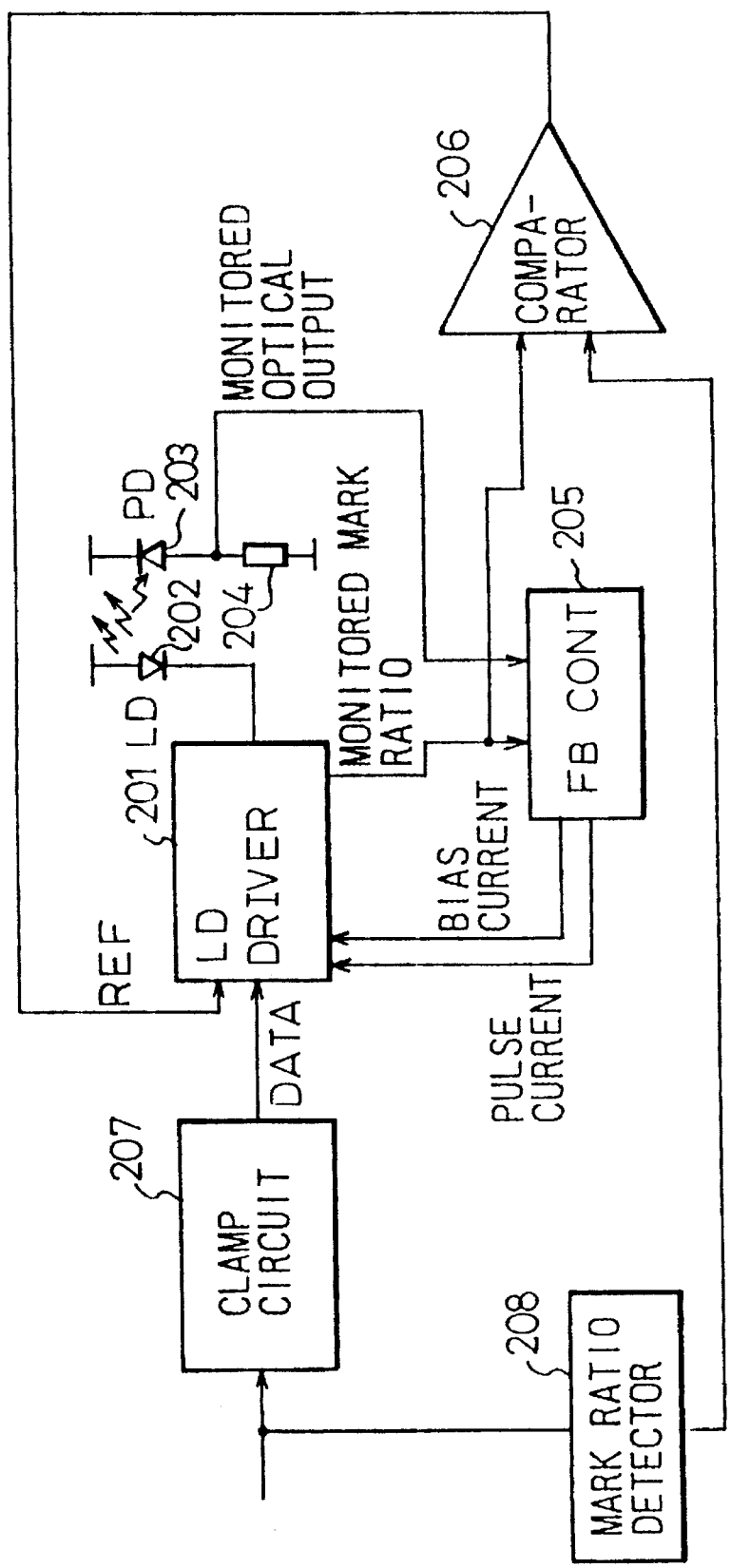
FIG. 13 shows an optical transmitter according to a second embodiment of the present invention.

FIG. 13 is a block diagram showing an optical transmitter according to the second embodiment of the present invention.

The second embodiment of FIG. 13 differs from the first embodiment of FIG. 7 in that the second embodiment employs a clamp circuit 207 and a mark ratio detector 208 instead of the flip-flop circuit 107 and average detector 108 of the first embodiment and in that a comparator 206 receives a monitored mark ratio instead of a monitored optical output voltage from an LD driver 201.

Figure 14:
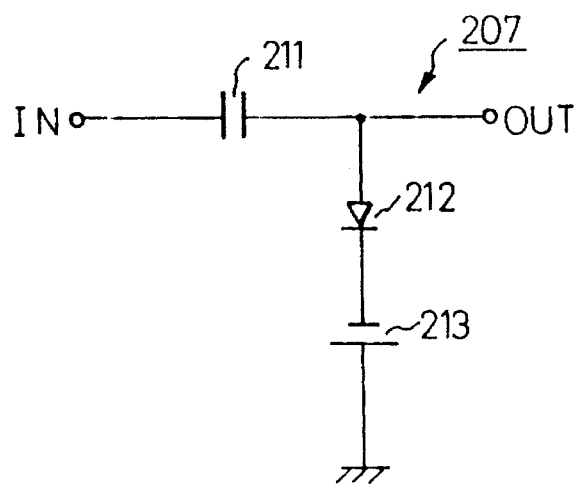
FIG. 14 shows a clamp circuit of the optical transmitter of FIG. 13.

FIG. 14 shows the clamp circuit 207 of FIG. 13.

The clamp circuit 207 clamps the level of an input signal at the sum of the clamp set potential 213 and the forward voltage of a clamp diode 212, to suppress a fluctuation in the input signal. Unlike the flip-flop circuit 107 of FIG. 7, the clamp circuit 207 needs no clock signal, to thereby reduce the size of the circuit.

Figure 15:
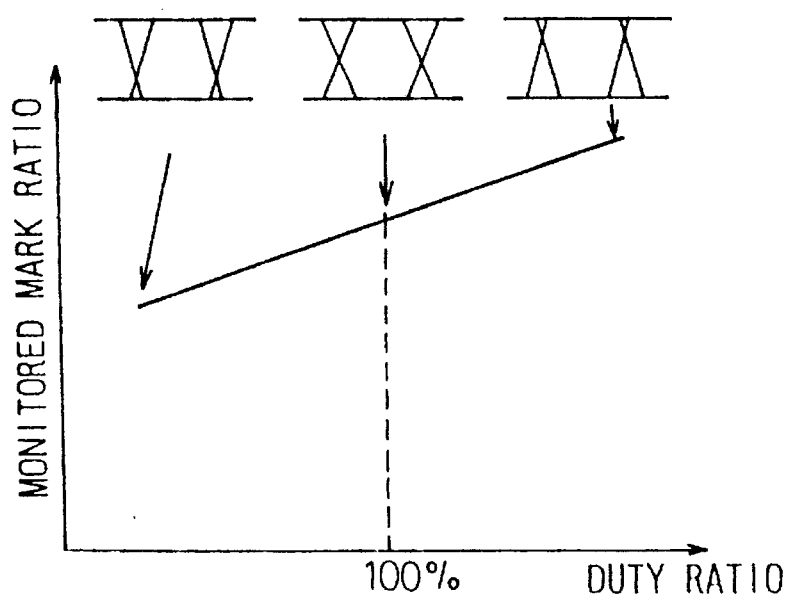
FIG. 15 shows a relationship between the duty ratio and monitored mark ratio of an optical output signal.

FIG. 15 shows the relationship between the duty ratio and mark ratio of an optical output signal.

Figure 16:
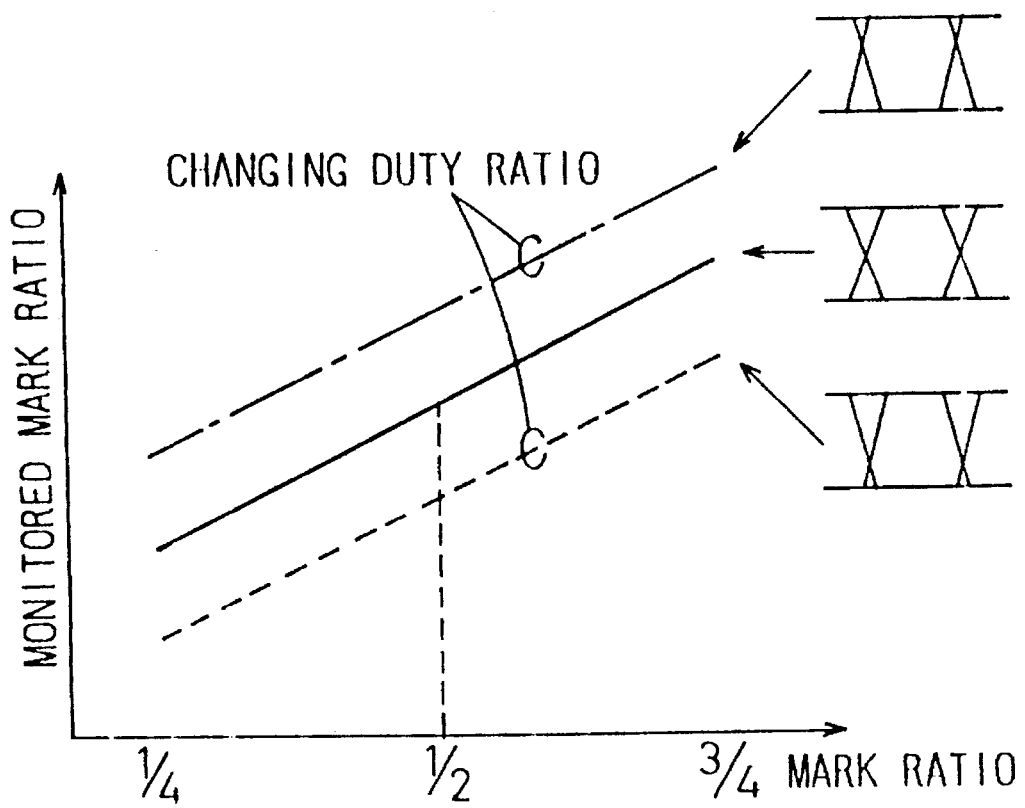
FIG. 16 shows a relationship between a mark ratio and a monitored mark ratio.

FIG. 16 shows a relationship between a mark ratio and a monitored mark ratio.

The ordinate of each of FIGS. 15 and 16 represents a monitoring mark ratio instead of the monitoring optical output voltage of FIGS. 10 and 11. This is because optical output power is in proportion to the monitoring mark ratio (FIG. 11). Namely, the monitoring mark ratio changes in response to a change in the duty ratio of the optical output signal or in an input mark ratio, similar to the monitoring optical output voltage, to realize control similar to the first embodiment.

The second embodiment forms a feedback loop for a monitored mark ratio without an LD 202 to realize a higher response speed than the first embodiment.

Figure 17:
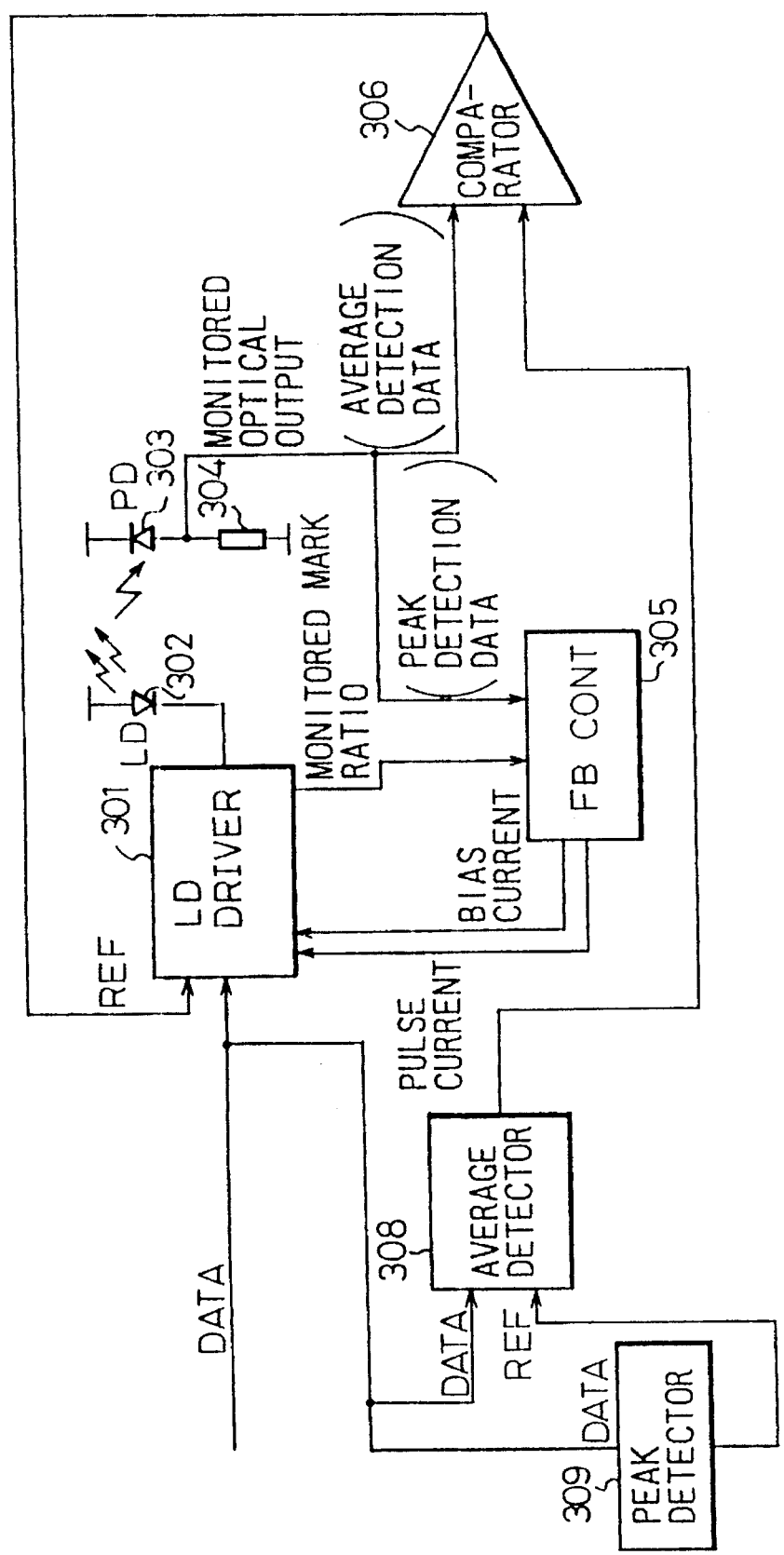
FIG. 17 shows an optical transmitter according to a third embodiment of the present invention.

FIG. 17 is a block diagram showing an optical transmitter according to the third embodiment of the present invention.

The third embodiment differs from the first embodiment of FIG. 7 in that it does not employ the flip-flop circuit 107 and employs a peak detector 309 instead of the reference voltage circuit 109. According to the third embodiment, a reference voltage applied to an average detector 308 is a peak voltage detected in an input data signal. Accordingly, the third embodiment correctly detects an average even if the level of the input data signal changes due to a change in the temperature.

Figure 18:
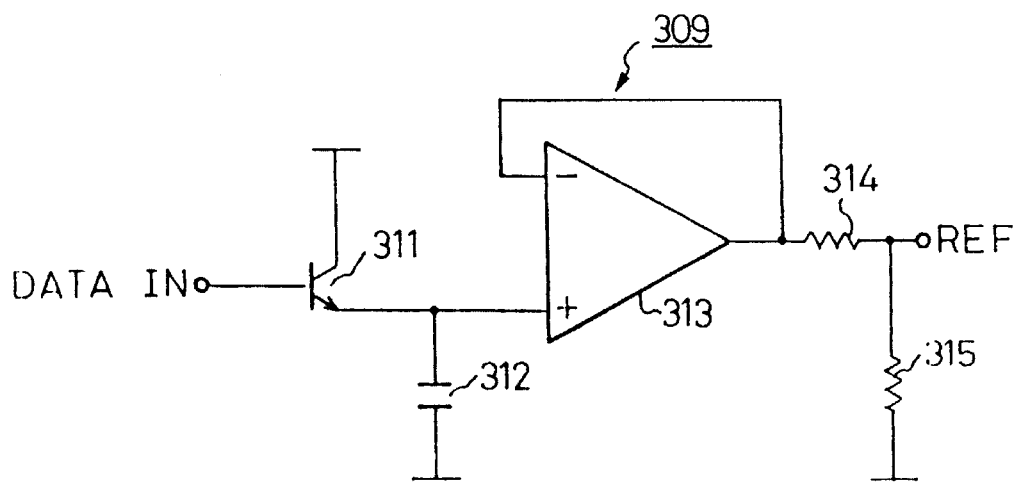
FIG. 18 shows a peak detector of the optical transmitter of FIG. 17.

FIG. 18 shows the peak detector 309 of FIG. 17.

In FIG. 18, an input data signal is passed through a transistor 311, and the peak of the input data signal is held by a capacitor 312. The peak is halved by a voltage follower 313 and halving resistors 314 and 315, to provide an intermediate level signal that follows a change in the level of the input data signal. For the sake of simplicity of explanation, the circuit detects a peak on "1" side. An offset of a "0" side peak may be detected by applying a "0" offset voltage to the operational amplifier 313 or to a circuit ground. Instead, each of the peaks may be detected and halved, to provide a halved voltage output.

Figure 19:
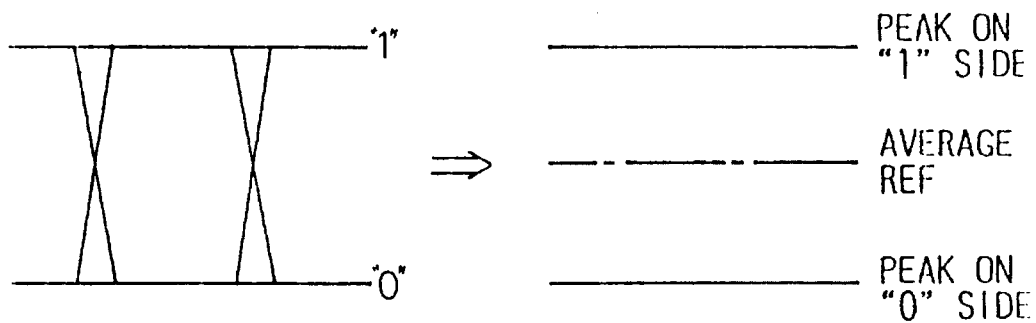
FIG. 19 explains the operation of the peak detector of FIG. 18.

FIG. 19 explains the operation of the peak detector 309 of FIG. 17.

The peak detector 309 detects peaks on the "1" and "0" sides in an input data signal. A central value of the two peaks is used as a reference voltage applied to the average detector 308. When an offset of the input data signal changes, the reference voltage to the average detector 308 follows the change, to correctly detect the average of the input data signal. Since the third embodiment correctly detects the average of an input data signal even if the level of the input data signal changes due to, for example, a change in the temperature, it does not need the flip-flop circuit 107 nor the clamp circuit 207 of the first and second embodiments.

Figure 20:
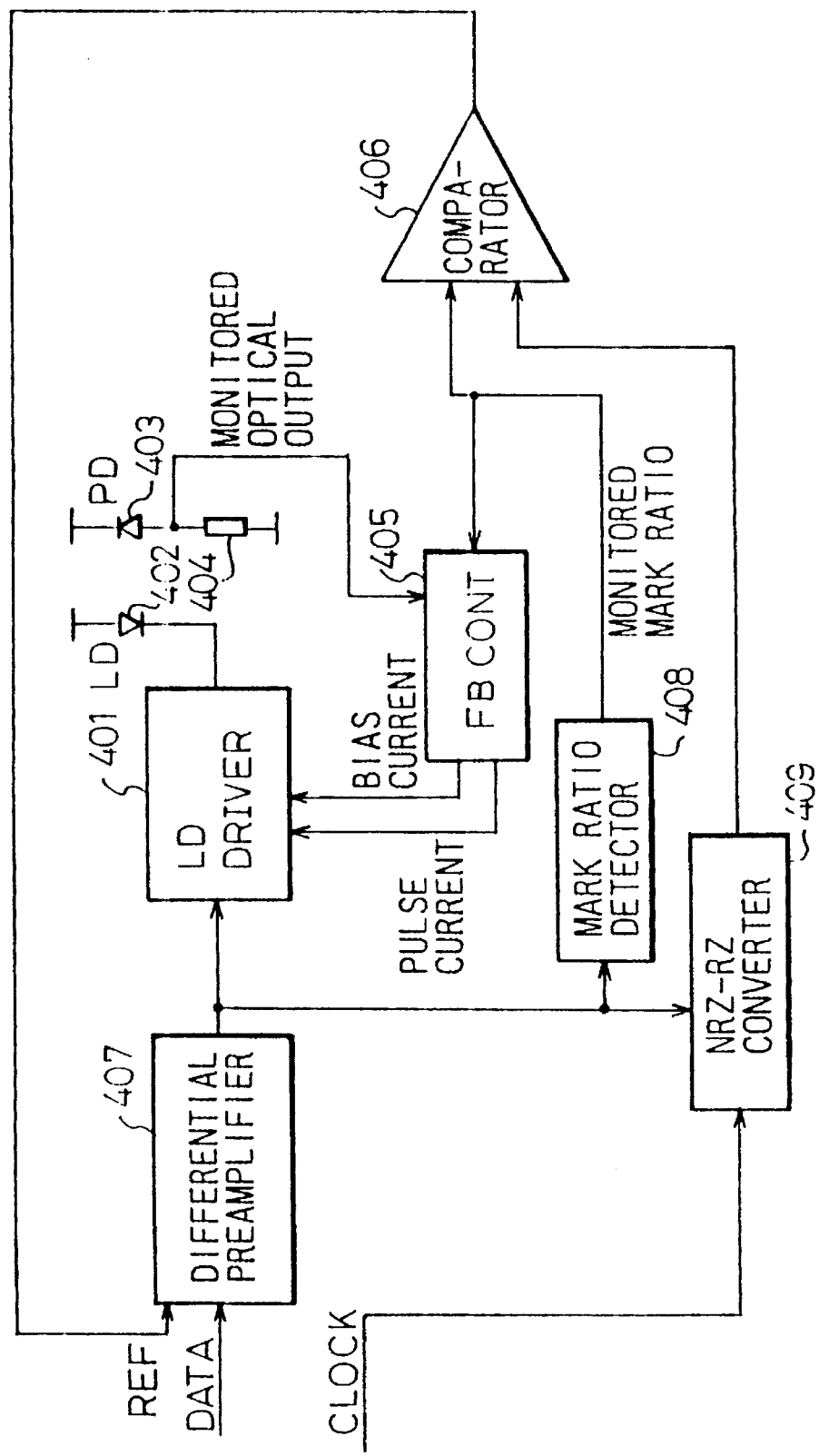
FIG. 20 shows an optical transmitter according to a fourth embodiment of the present invention.
Figure 21:
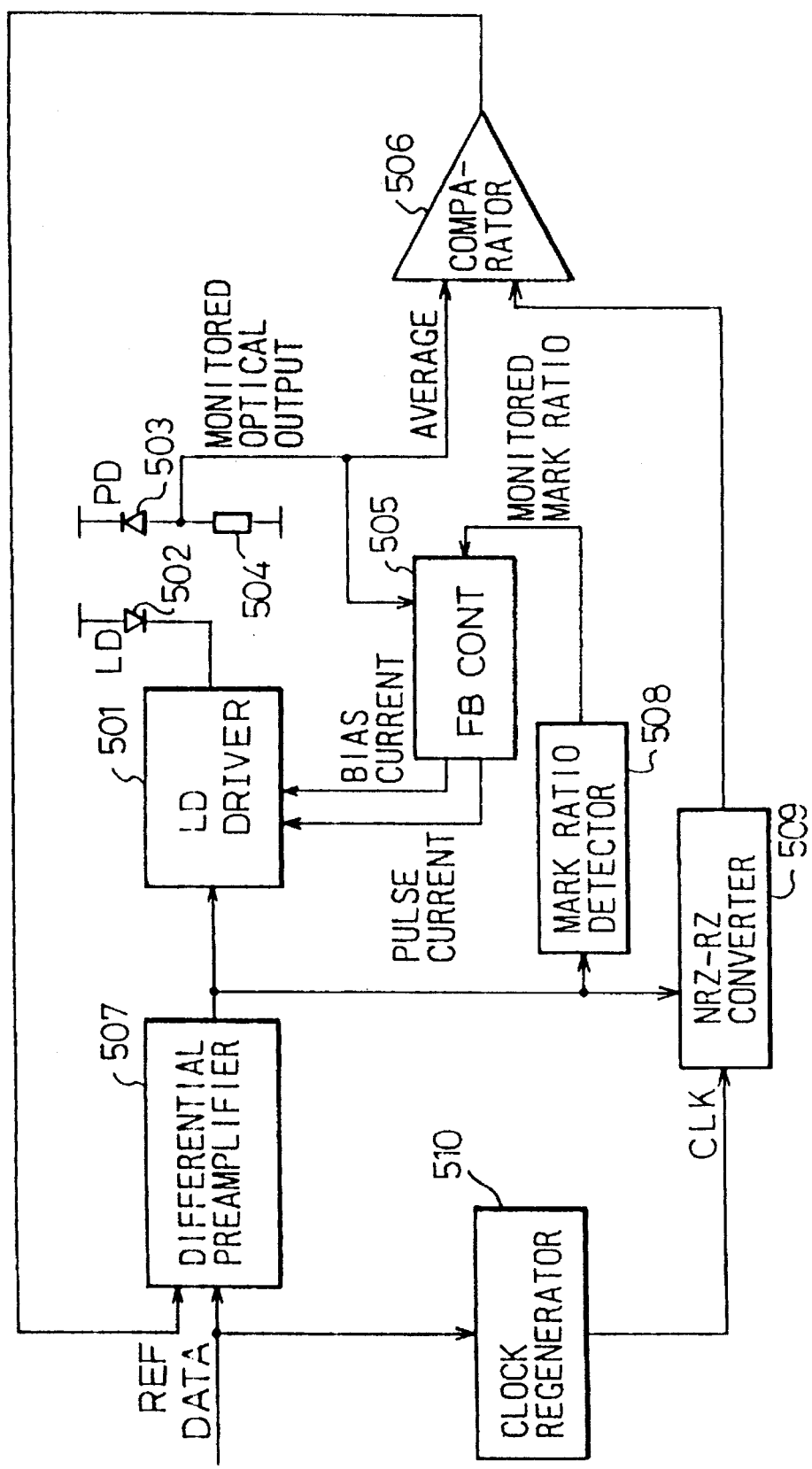
FIG. 21 shows an optical transmitter according to a fifth embodiment of the present invention.

FIGS. 20 shows an optical transmitter according to the fourth embodiment and FIG. 21 shows an optical transmitter according to the fifth embodiment of the present invention.

The fourth embodiment of FIG. 20 differs from the first embodiment of FIG. 7 in that it employs a differential preamplifier 407, an NRZ-RZ converter 409, and a mark ratio detector 408 instead of the flip-flop circuit 107, average detector 108, and reference voltage circuit 109 of FIG. 7. The output of the mark ratio detector 408 is sent to a comparator 406 and a feedback controller 405.

The fifth embodiment of FIG. 21 differs from the fourth embodiment in that it additionally has a clock regenerator 510 and in that a comparator 506 receives a monitoring optical output voltage similar to FIG. 7.

In each of the fourth and fifth embodiments, the NRZ-RZ converter 409 or 509 extracts a fluctuation in the duty ratio of an input data signal, and the fluctuation is used to carry out feedback control of an external reference voltage REF.

Figure 22:
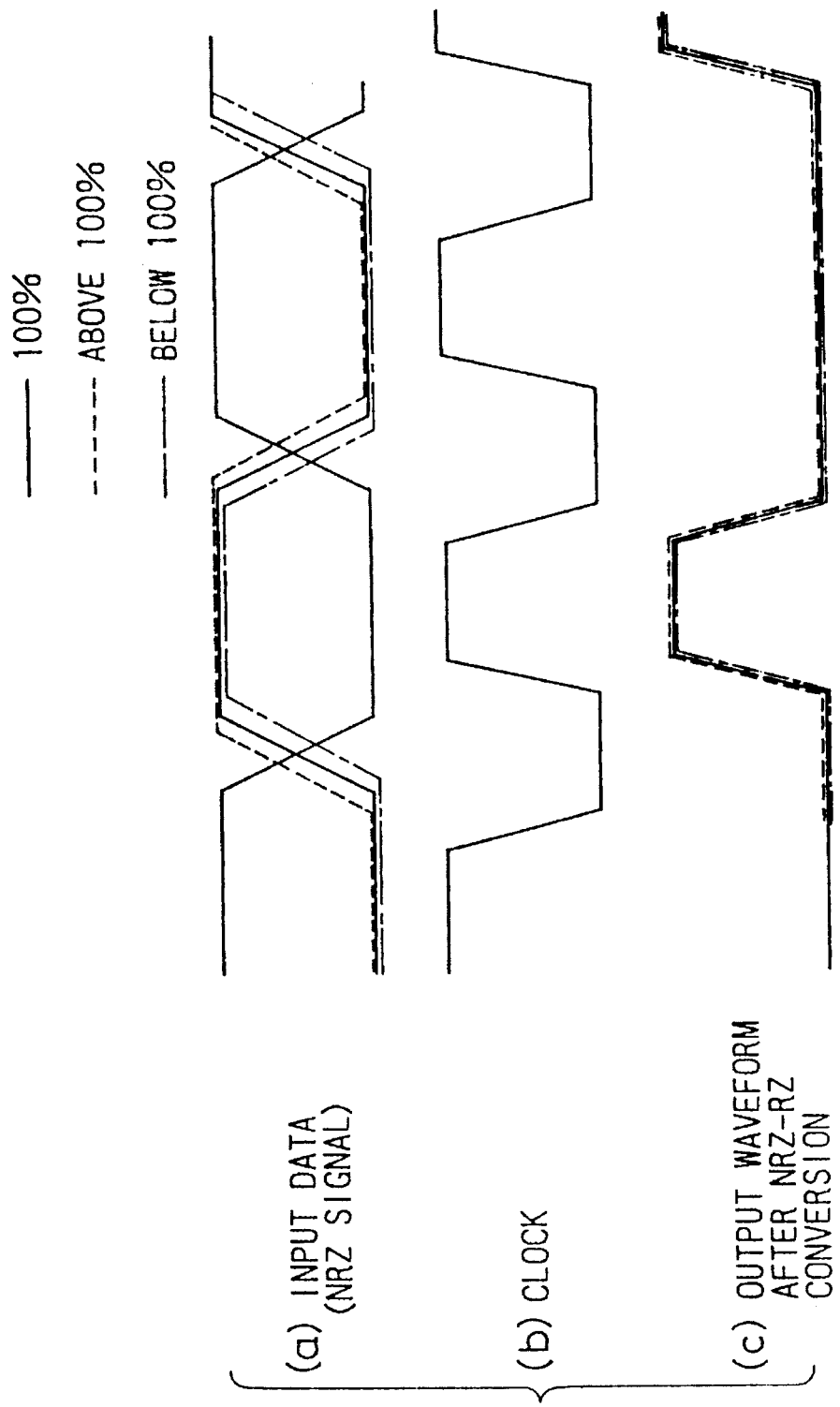
FIG. 22 is a waveform diagram showing the input and output characteristics of an NRZ-RZ converter.

FIG. 22 shows the waveforms of input and output signals of the NRZ-RZ converter.

The NRZ input signal of FIG. 22(a) is converted into the RZ output signal of FIG. 22(c) according to a clock signal of FIG. 22(b). The RZ output signal is an AND of the "1" bits of the NRZ input signal excluding the edges parts thereof and the clock signal. Namely, the RZ output signal does not include the edges affected by the duty ratio of the input signal. This means that the RZ output signal is independent of the duty ratio of the input signal.

Figure 23:
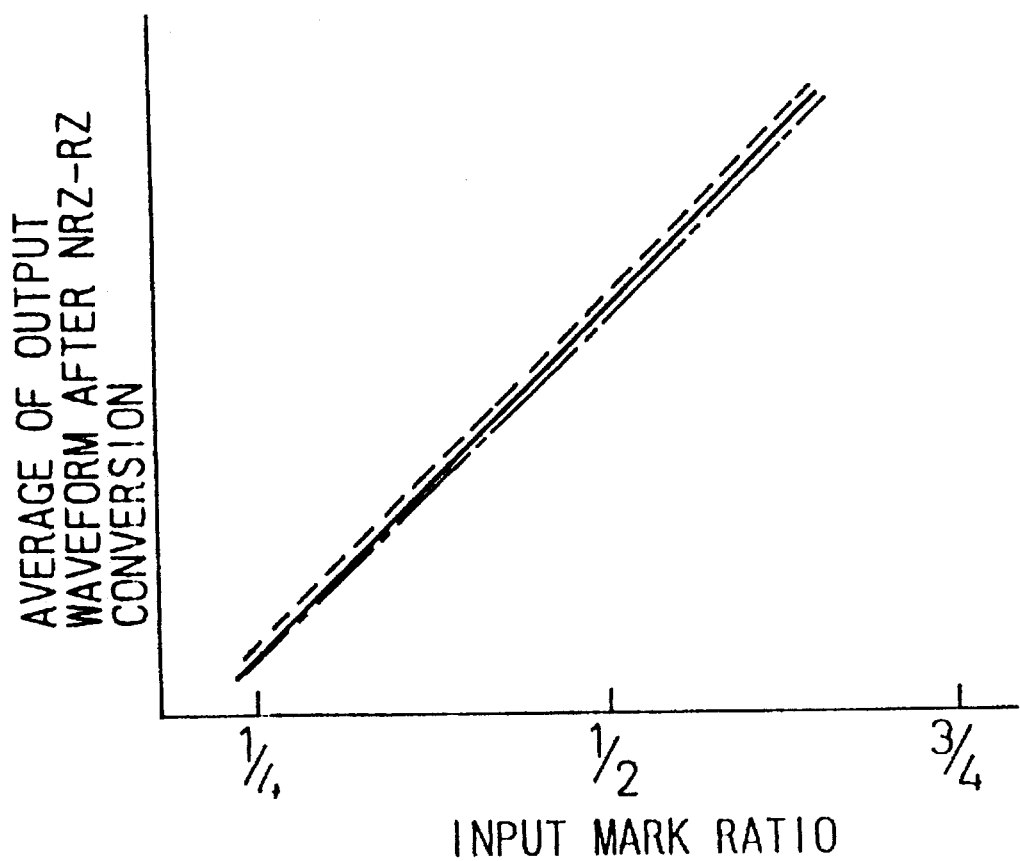
FIG. 23 shows a relationship between the mark ratio of an input signal and the average of an NRZ-RZ-converted output signal.

FIG. 23 shows a relationship between the mark ratio of an input signal and the average of an NRZ-RZ-converted output signal.

The output of the NRZ-RZ converter correctly corresponds to the mark ratio of the input signal.

As explained above, the output of the NRZ-RZ converter is not affected by the duty ratio of an input data signal and is directly proportional to the mark ratio of the input data signal. Accordingly, an NRZ input signal to an LD driver 401 is converted into an RZ signal by the NRZ-RZ converter 409, and the comparator 406 compares the output of the NRZ-RZ converter 409, independent of the duty ratio of the input signal, with a signal from the mark ratio detector 408 that is not NRZ-RZ-converted and is dependent on the duty ratio of the input signal. The RZ signal is averaged by an internal circuit. The difference provided by the comparator 406 corresponds to a fluctuation in the duty ratio of the input signal and is used to control a reference voltage REF to make the duty ratio of an optical output signal constant.

The differential preamplifier 407 of FIG. 20 is arranged before the NRZ-RZ converter 409, to shape the input signal.

The fifth embodiment of FIG. 21 has a clock regenerator 510 for directly extracting and regenerating a clock signal to the NRZ-RZ converter 509, instead of providing a system clock signal as in the fourth embodiment of FIG. 20. The comparator 506 compares the RZ output signal of the NRZ-RZ converter 509 with the monitored optical output voltage instead of the monitored mark ratio of FIG. 20.

The operation of the fifth embodiment of FIG. 21 is the same as that of the fourth embodiment of FIG. 20, and therefore, it will not be explained again.

FIG. 24 shows an optical transmitter according to the sixth embodiment of the present invention.

This embodiment employs only a peak detector 607 to achieve the characteristics of the present invention. The peak detector 607 is the same as the peak detector 309 of FIG. 17, and therefore, it will not be explained again.

Unlike the first to fifth embodiments that carry out feedback control on elements inside the LD driver that may fluctuate the duty ratio of an output signal, the sixth embodiment does not compensate for fluctuations in these elements. Instead, the sixth embodiment employs the peak detector 607 to compensate for a fluctuation in the duty ratio of an output signal due to a fluctuation in the level of an input data signal.

As explained above, an optical transmitter according to the present invention is not affected by the different characteristics of internal elements of an IC circuit such as an LD driver or by a change in the temperature. Accordingly, it is not necessary to externally adjust the IC circuit or measure the characteristics of the internal elements. The optical transmitter automatically carries out compensation to optimize the duty ratio of an optical output signal. The present invention is particularly effective with ICs made of high-speed gallium arsenide active elements.

The present invention eliminates a fluctuation in the level of an input data signal supplied to an LD driver, detects a fluctuation in a duty ratio in the LD driver, and automatically optimizes a reference voltage REF applied to the LD driver. The present invention detects the fluctuation in the LD driver and controls the duty ratio of an optical output signal after eliminating a fluctuation in the mark ratio of the optical output signal and a fluctuation in the level of the input data signal at low cost and high accuracy.

We claim:

1. An optical transmitter comprising:

optical signal output means for providing an optical output signal according to an electric signal;

monitor means for providing an output representative signal related to the optical output signal;

drive means for determining the logical value of each bit of an input data signal according to a reference voltage and driving the optical signal output means according to the determination;

input signal detection means for providing an input representative signal according to the input data signal; and duty ratio control means for comparing the input and output representative signals with each other and controlling the reference voltage to the drive means such that the difference between the input and output representative signals is reduced, to thereby optimize the duty ratio of the optical output signal.

2. The optical transmitter as claimed in claim 1, wherein the output representative signal is the optical output signal from the optical signal output means.

3. The optical transmitter as claimed in claim 1, wherein the output representative signal is a mark ratio signal provided by the drive means.

4. The optical transmitter as claimed in claim 2, wherein the input signal detection means has an average detector for providing, as the input representative signal, the average of the input data signal.

5. The optical transmitter as claimed in claim 4, wherein the average detector has a reference circuit for providing a reference voltage to remove an offset voltage from the input data signal.

6. The optical transmitter as claimed in claim 5, wherein the reference circuit has a peak detector that provides, as the reference voltage, a peak voltage of the input data signal.

7. The optical transmitter as claimed in claim 3, wherein the input signal detection means has a mark ratio detector that provides, as the input representative signal, a signal representing the mark ratio of the input data signal.

8. The optical transmitter as claimed in claim 4 or 7, wherein the input signal detection means has an NRZ-RZ converter that provides, as the input representative signal, an RZ signal converted from an NRZ signal.

9. The optical transmitter as claimed in claim 8, wherein the NRZ-RZ converter converts the NRZ signal into the RZ signal by sampling the NRZ signal excluding the edge parts thereof according to a clock signal that is provided in synchronization with the input data signal.

10. The optical transmitter as claimed in claim 8, wherein the NRZ-RZ converter has a clock regenerator that regenerates a clock signal from the input data signal and converts the NRZ signal into the RZ signal by sampling the NRZ signal excluding the edge parts thereof according to the clock signal.

11. The optical transmitter as claimed in claim 1, further comprising shaping means for shaping the input data signal, to cancel a fluctuation in the average of the input data signal, and provide the drive means with the shaped input data signal.

12. The optical transmitter as claimed in claim 11, wherein the shaping means has a clamp circuit for removing a fluctuation in the level of the input data signal.

13. The optical transmitter as claimed in claim 11, wherein the shaping means has a flip-flop circuit for removing a fluctuation in the level of the input data signal and/or making the pulse width of the input data signal constant.

* * * * *